US010569680B2

(12) United States Patent
Rasello

(10) Patent No.: US 10,569,680 B2
(45) Date of Patent: Feb. 25, 2020

(54) SEAT ASSEMBLY WITH ADHERED BRACKETS

(71) Applicant: Lear Corporation, Southfield, MI (US)

(72) Inventor: Andrea Rasello, Grugliasco (IT)

(73) Assignee: Lear Corporation, Southfield, MI (US)

(*) Notice: Subject to any disclaimer, the term of this patent is extended or adjusted under 35 U.S.C. 154(b) by 96 days.

(21) Appl. No.: 15/960,928

(22) Filed: Apr. 24, 2018

(65) Prior Publication Data
US 2019/0322199 A1    Oct. 24, 2019

(51) Int. Cl.
  *B60N 2/68*    (2006.01)
  *B60N 2/42*    (2006.01)
  *B60N 2/20*    (2006.01)
  *B60N 2/22*    (2006.01)
  *F16B 11/00*   (2006.01)

(52) U.S. Cl.
  CPC ............... *B60N 2/682* (2013.01); *B60N 2/20* (2013.01); *B60N 2/22* (2013.01); *B60N 2/42* (2013.01); *F16B 11/006* (2013.01); *B60N 2002/684* (2013.01)

(58) Field of Classification Search
  CPC ........... B60N 2/42; B60N 2/682; B60N 2/686
  See application file for complete search history.

(56) References Cited

U.S. PATENT DOCUMENTS

| 8,205,833 | B2 | 6/2012 | Kismarton et al. | |
| 8,894,154 | B2* | 11/2014 | Kulkarni | B60N 2/682 |
| | | | | 297/452.1 |
| 8,985,696 | B2 | 3/2015 | Yasuda et al. | |
| 9,623,770 | B2* | 4/2017 | Furuta | B60N 2/68 |
| 2013/0320742 | A1* | 12/2013 | Murolo | B60N 2/68 |
| | | | | 297/452.18 |
| 2014/0139004 | A1* | 5/2014 | Matsumoto | B60N 2/68 |
| | | | | 297/452.18 |
| 2015/0210194 | A1* | 7/2015 | Furuta | B60N 2/68 |
| | | | | 297/391 |
| 2015/0217868 | A1 | 8/2015 | Gonnsen et al. | |
| 2016/0107555 | A1* | 4/2016 | Rao | B60N 2/58 |
| | | | | 428/189 |
| 2016/0221485 | A1* | 8/2016 | Harris | B32B 27/38 |
| 2016/0339821 | A1* | 11/2016 | Akaike | B60N 2/68 |
| 2017/0197533 | A1* | 7/2017 | Schlitt | B60N 2/20 |
| 2017/0267146 | A1* | 9/2017 | Ferguson | A47C 5/12 |
| 2018/0105085 | A1* | 4/2018 | Duncan | B60N 2/682 |
| 2018/0334065 | A1* | 11/2018 | Suzuki | B60N 2/688 |
| 2018/0339613 | A1* | 11/2018 | Mizobata | B60N 2/42709 |
| 2018/0354393 | A1* | 12/2018 | Mizobata | B60N 2/2352 |

FOREIGN PATENT DOCUMENTS

CN          105564283 B   *   6/2018

* cited by examiner

Primary Examiner — Timothy J Brindley
(74) Attorney, Agent, or Firm — Brooks Kushman P.C.

(57) ABSTRACT

A seat assembly having a seat bottom and a seat back. The seat bottom may have a pair of side members that are adhered to a seat bottom shell. The seat back may have a pair of brackets that may be adhered to a seat back shell. The seat bottom shell and the seat back shell may be made of carbon fiber.

20 Claims, 5 Drawing Sheets

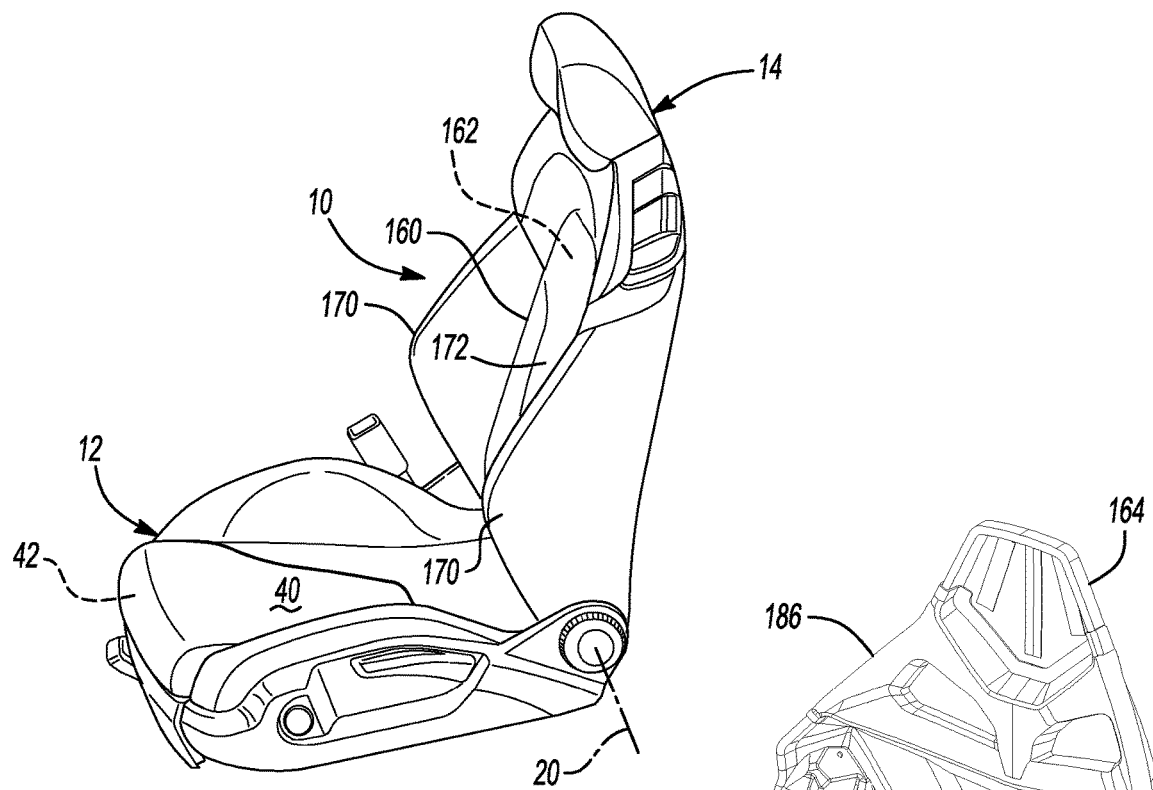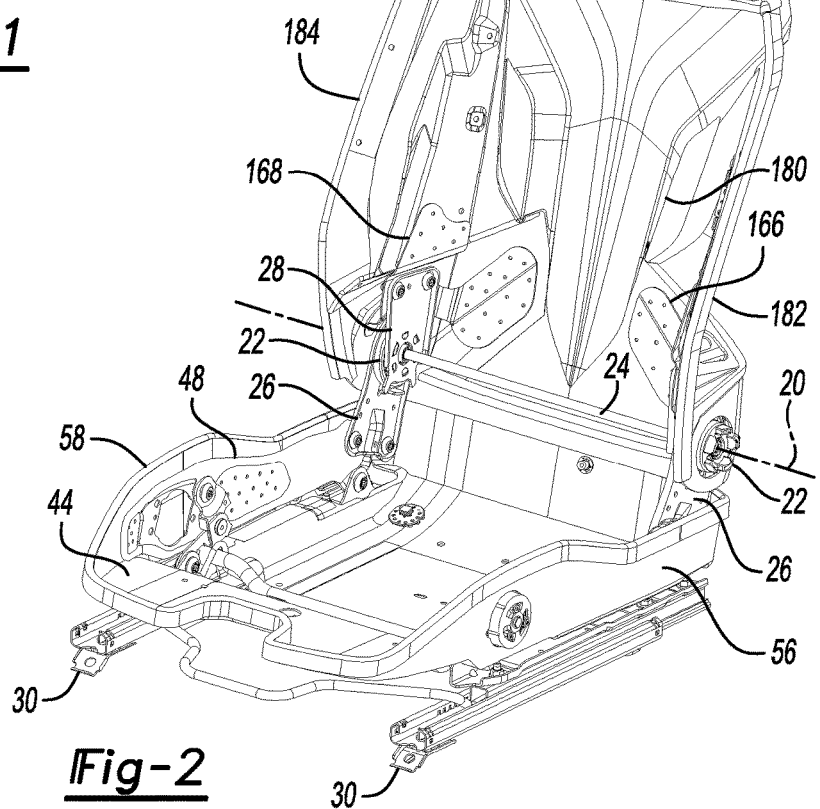

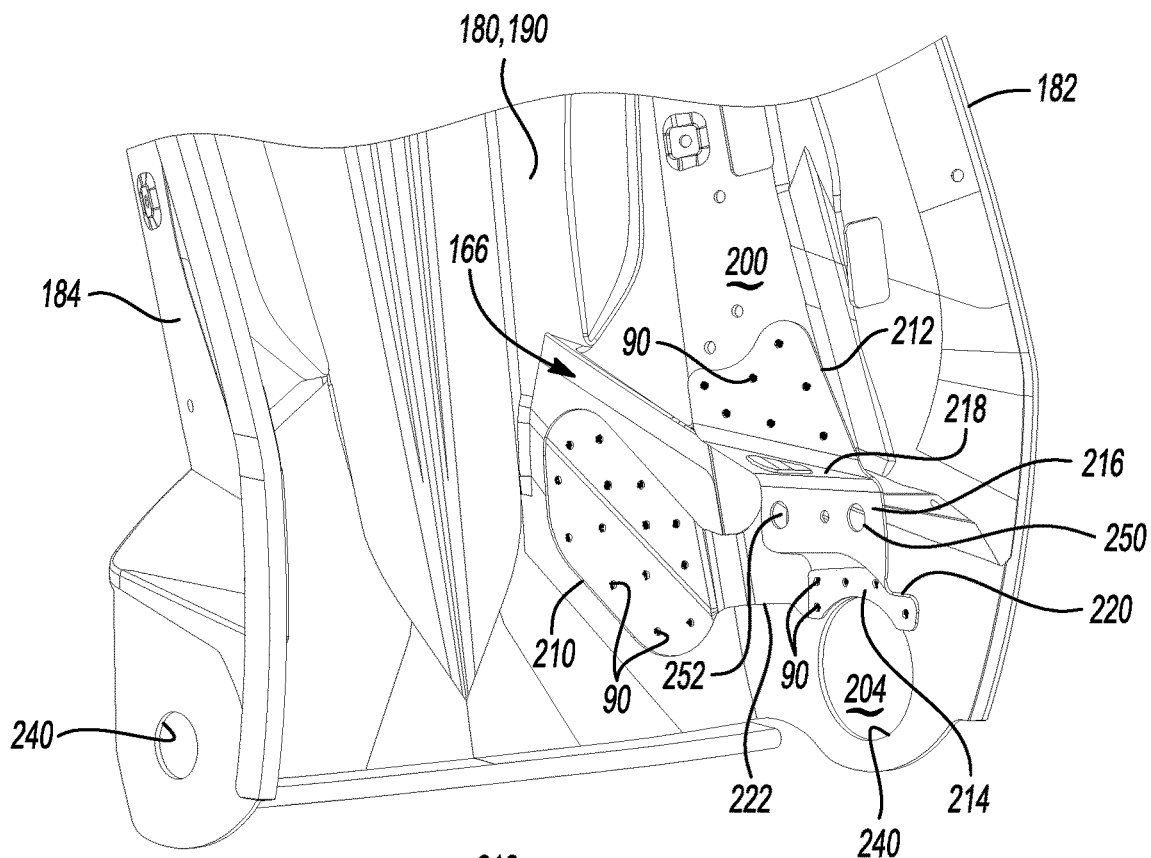
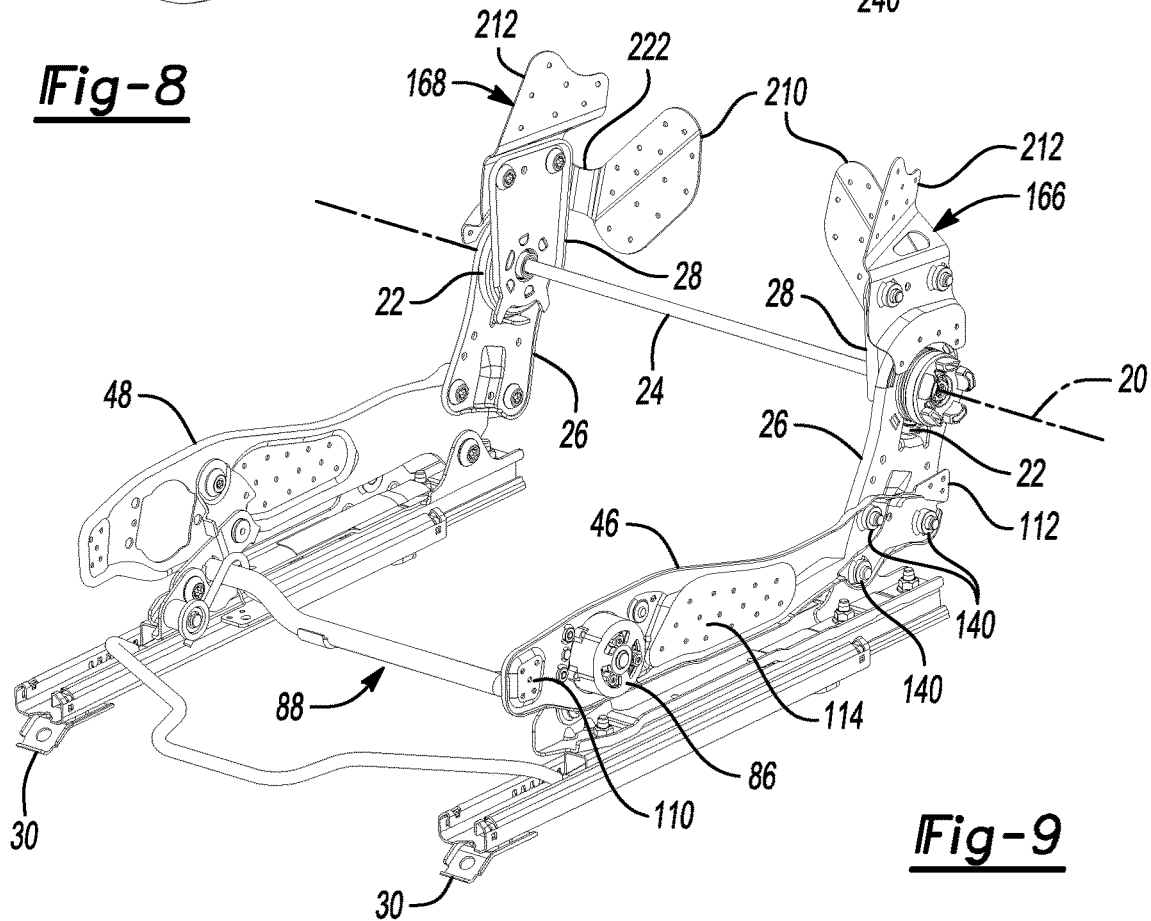
Fig-8
Fig-9

SEAT ASSEMBLY WITH ADHERED BRACKETS

TECHNICAL FIELD

This disclosure relates to a seat assembly that may include brackets that are adhered to a shell, such as a carbon fiber shell.

BACKGROUND

A vehicle seat having a fiber-reinforced plastic reinforcement section is disclosed in U.S. Pat. No. 8,985,696.

SUMMARY

In at least one embodiment, a seat assembly is provided. The seat assembly may include a seat bottom and a seat back. The seat bottom may have a seat bottom shell, a first side member, and a second side member. The seat bottom shell may be made of carbon fiber and may have a first lateral side wall and a second lateral side wall. The second lateral side wall may be spaced apart from the first lateral side wall and may be disposed opposite the first lateral side wall. The first side member may be adhered to an inboard side of the first lateral side wall with an adhesive. The second side member may be adhered to an inboard side of the second lateral side wall with an adhesive. The first side member and the second side member may be made of metal. The seat back may be pivotally disposed on the seat bottom. The seat back may have a seat back shell, a first bracket, and a second bracket. The seat back shell may be made of carbon fiber. The first bracket may be adhered to the seat back shell with an adhesive. The second bracket may be spaced apart from the first bracket and may be adhered to the seat back shell with an adhesive. The first bracket and the second bracket may be made of metal.

In at least one embodiment, a seat assembly is provided. The seat assembly may include a seat bottom and a seat back. The seat bottom may include a seat bottom shell, a first side member, and a second side member. The seat bottom shell may be made of carbon fiber. The first side member and the second side member may be made of metal and may be adhered to the seat bottom shell. The seat back may be pivotally disposed on the seat bottom. The seat back may include a seat back shell, a first bracket, and a second bracket. The seat back shell may be made of carbon fiber and may have a back panel, a first side wall, and a second side wall. The first side wall and the second side wall may extend forward from the back panel. The first bracket may be adhered to the back panel and the first side wall with an adhesive. The second bracket may be spaced apart from the first bracket and may be adhered to the back panel and the second side wall with an adhesive. The first bracket and the second bracket may be made of metal.

BRIEF DESCRIPTION OF THE DRAWINGS

FIG. 1 is a perspective view of a seat assembly.

FIG. 2 is a perspective view of the seat assembly with the trim and cushions removed.

FIG. 8 is a magnified perspective view of a portion of the seat back structure of FIG. 6.

FIG. 9 is a perspective view of a portion of the seat assembly shown in FIG. 2 without a seat bottom shell and a seat back shell.

DETAILED DESCRIPTION

Figure 3:
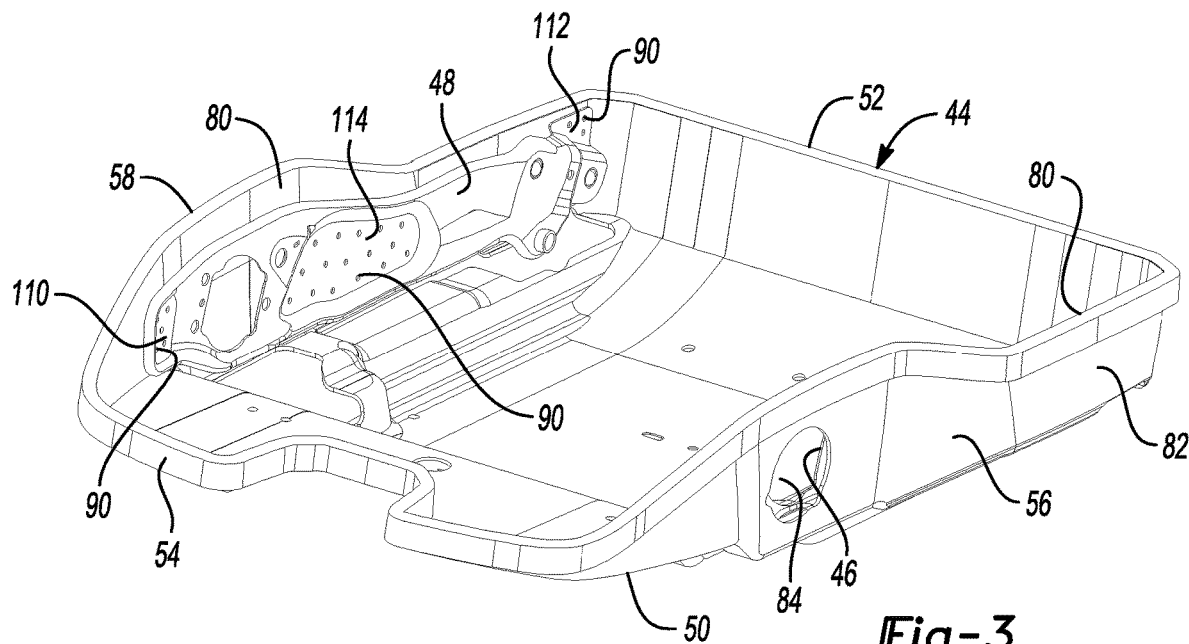
FIG. 3 is a perspective view of a seat bottom structure of the seat assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an example of a seat assembly 10 is shown. The seat assembly 10 may be configured for use with a vehicle, such as a motor vehicle like a car or truck, aircraft, or marine vessel. The seat assembly 10 may include a seat bottom 12 and a seat back 14.

Referring to FIGS. 1 and 2, the seat back 14 may be pivotal about an axis 20 with respect to the seat bottom 12. For example, a pair of recliner mechanisms 22 may pivotally connect the seat back 14 to the seat bottom 12 as is best shown in FIG. 2. A synchronization rod 24 may extend along the axis 20 between the recliner mechanisms 22 to synchronize operation of the recliner mechanisms 22 in a manner known by those skilled in the art. In at least one configuration, a lower recliner mechanism bracket 26 and an upper recliner mechanism bracket 28 may extend from the recliner mechanism 22. The lower recliner mechanism bracket 26 may connect a first plate of the recliner mechanism 22 to the seat bottom 12. The upper recliner mechanism bracket 28 may connect a second plate of the recliner mechanism 22 to the seat back 14.

Referring to FIGS. 1-3, the seat bottom 12 may be configured to support a seat occupant. In a vehicular application, the seat bottom 12 may be mounted to a support surface, such as a vehicle floor. For example, the seat bottom 12 may be mounted on a seat track assembly 30 which in turn may be mounted on a support surface. The seat track assembly 30 may permit longitudinal movement of the seat assembly 10 in a fore/aft or forward/backward direction with respect to the support surface. In at least one configuration, the seat bottom 12 may include seat bottom trim cover 40, seat bottom cushion 42, a seat bottom shell 44, a first side member 46, and a second side member 48.

Referring to FIG. 1, the seat bottom trim cover 40 may be disposed over or upon the seat bottom cushion 42 and may form or provide at least a portion of a visible exterior surface of the seat bottom 12. Moreover, a seat occupant may be disposed on the seat bottom trim cover 40 when in a seated position. The seat bottom trim cover 40 may include a plurality of trim panels that may be assembled in any suitable manner, such as by stitching. In addition, the seat bottom trim cover 40 may be made of any suitable material or materials, such as fabric, leather, vinyl, carpet, or combinations thereof.

The seat bottom cushion 42 may be at least partially concealed by the seat bottom trim cover 40 and may be directly or indirectly supported by the seat bottom shell 44. The seat bottom cushion 42 may be made of any suitable material, such as foam.

Referring to FIGS. 2-5, the seat bottom shell 44 may help provide structural support for the seat bottom 12. The seat bottom shell 44 may be made of a fiber reinforced material, such as a polymeric resin that may incorporate and may be reinforced with carbon fiber. As such, the seat bottom shell 44 may allow a seat bottom 12 to be provided that may have high strength and low weight. In at least one configuration, the seat bottom shell 44 may be configured as a pan that may extend laterally across the seat bottom 12 and may have a plurality of walls that may define multiple sides that may define the perimeter of the seat bottom shell 44. For instance, the seat bottom shell 44 may include a bottom wall 50, a rear wall 52, a front wall 54, a first lateral side wall 56, and a second lateral side wall 58, and a seat bottom shell cavity 60.

Figure 4:
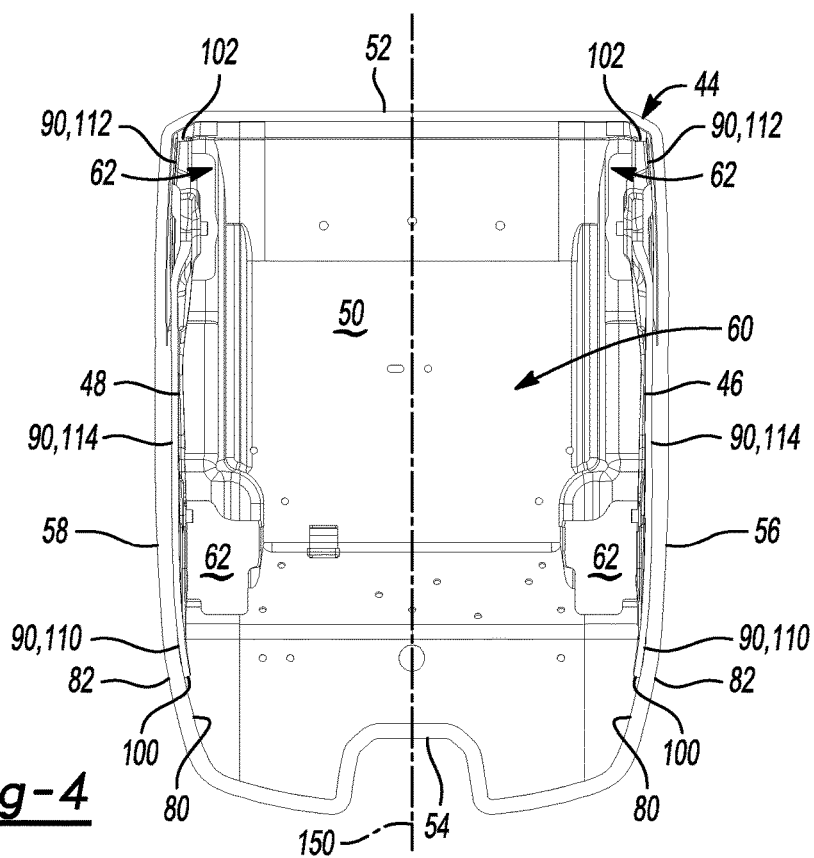
FIG. 4 is a top view of the seat bottom structure shown in FIG. 3.
Figure 5:
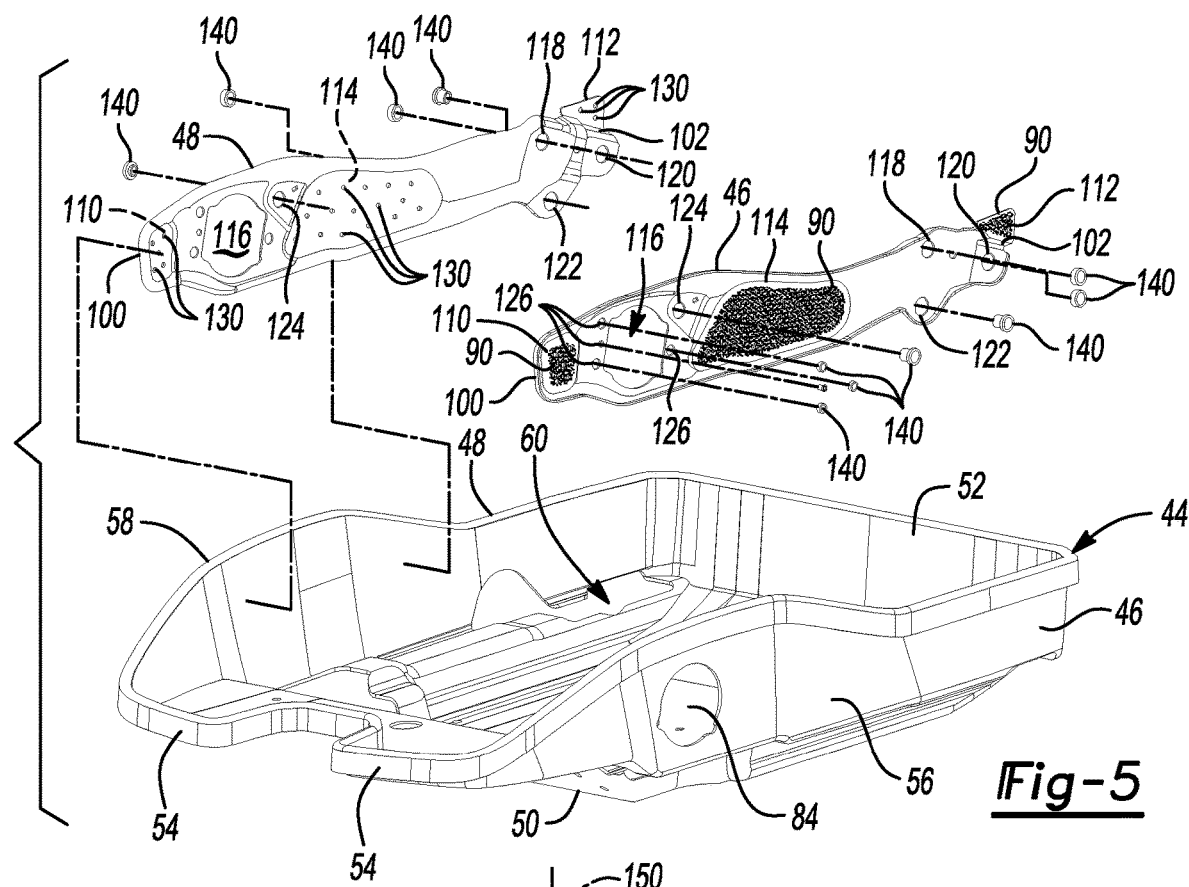
FIG. 5 is an exploded view of the seat bottom structure of FIG. 3.

Referring to FIGS. 3-5, the bottom wall 50 may at least partially define the bottom of the seat bottom 12. For instance, the bottom wall 50 may extend in a longitudinal direction (e.g., a direction extending between the front and back of the seat) from the rear wall 52 to the front wall 54 and may extend in a lateral direction (e.g., a direction perpendicular to the longitudinal direction that may extend between the left and right lateral side of the seat assembly) from the first lateral side wall 56 to the second lateral side wall 58. The bottom wall 50 may have an upper surface that may face toward and may directly or indirectly engage and support the seat bottom cushion 42. In addition, the bottom wall 50 may have a plurality of seat track openings 62 through which the seat track assembly 30 may extend. In the configuration shown in FIG. 4, four seat track openings 62 are provided that are spaced apart from each other and disposed adjacent to either the first lateral side wall 56 or the second lateral side wall 58.

The rear wall 52 may be disposed at the rear end of the seat bottom shell 44. The rear wall 52 may extend from an end of the bottom wall 50. More specifically, the rear wall 52 may extend in an upward direction toward the seat back 14 from a rear end of the bottom wall 50. The rear wall 52 may be disposed under the seat back 14.

The front wall 54 may be disposed at a front end of the seat bottom shell 44. The front wall 54 may extend from a front end of the bottom wall 50 that may be disposed opposite the rear end. As such, the front wall 54 may be disposed opposite the rear wall 52 and may be completely spaced apart from the rear wall 52.

The first lateral side wall 56 may be disposed at a first lateral side of the seat bottom shell 44. For instance, the first lateral side wall 56 may extend along a left side or a right side of the seat bottom shell 44. For convenience in reference, the first lateral side wall 56 is depicted as extending along the right side of the seat bottom shell 44 when the seat bottom shell 44 is viewed from above; however, it is contemplated that the first lateral side wall 56 could also be depicted as extending along the left side of the seat bottom shell 44.

The first lateral side wall 56 may extend from an end of the bottom wall 50 in an upward direction. In addition, the first lateral side wall 56 may extend from an end of the rear wall 52 to an end of the front wall 54. In at least one configuration, the first lateral side wall 56 may include an inboard side 80, an outboard side 82, and a tilt adjuster aperture 84.

The inboard side 80 may face toward the center of the seat bottom 12. For instance, the inboard side 80 may face toward the second lateral side wall 58.

The outboard side 82 may be disposed opposite the inboard side 80. As such, the outboard side 82 may face toward the exterior of the seat bottom shell 44.

The tilt adjuster aperture 84 may be a through hole that may extend from the inboard side 80 to the outboard side 82. As is best shown in FIG. 2, the tilt adjuster aperture 84 may be configured to receive an actuator 86, such as a knob or linkage that may facilitate adjustment of a tilt adjuster mechanism 88 (which is best shown in FIG. 9) that may change the angle of inclination or tilt angle of the seat bottom 12 in a manner known by those skilled in the art. For example, the tilt adjuster aperture 84 may receive the actuator when the first lateral side wall 56 is disposed adjacent to a vehicle door. In at least one configuration, the tilt adjuster aperture 84 may be the only opening that is provided in the first lateral side wall 56.

The second lateral side wall 58 may be disposed opposite the first lateral side wall 56. As such, the second lateral side wall 58 may be disposed at a second lateral side of the seat bottom shell 44. For instance, the second lateral side wall 58 may extend along a left side or a right side of the seat bottom shell 44. For convenience in reference, the second lateral side wall 58 is depicted as extending along the left side of the seat bottom shell 44 when the seat bottom shell 44 is viewed from above; however, it is contemplated that the designations of the first lateral side wall 56 and the second lateral side wall 58 may be reversed.

The second lateral side wall 58 may extend from an end of the bottom wall 50 in an upward direction. In addition, the second lateral side wall 58 may extend from an end of the rear wall 52 to an end of the front wall 54. In at least one configuration, the second lateral side wall 58 may include an inboard side 80, an outboard side 82, and a tilt adjuster aperture 84 as previously described. The inboard side 80 of the second lateral side wall 58 may face toward the center of the seat bottom 12 and toward the first lateral side wall 56.

Referring to FIGS. 4 and 5, the seat bottom shell cavity 60 may be the recess or depression that is defined and bounded by the seat bottom shell 44. For example, the seat bottom shell cavity 60 may be bounded by the bottom wall 50, rear wall 52, front wall 54, first lateral side wall 56, and second lateral side wall 58.

Referring to FIGS. 3-5, The first side member 46 may be received in the seat bottom shell cavity 60. More specifically, the first side member 46 may be adhered to the inboard side 80 of the first lateral side wall 56 with an adhesive 90. In addition, the first side member 46 may be completely received inside the seat bottom shell cavity 60 in one or more configurations. For instance, the first side member 46 may be disposed above the bottom wall 50 and may not extend vertically past the top of the first lateral side wall 56. In addition, the first side member 46 may be longitudinally positioned between and may be spaced apart from the rear wall 52 and the front wall 54. The first side member 46 may extend along the first lateral side wall 56 and may extend in a fore/aft or forward/backward direction from a front end 100 of the first side member 46 to a rear end 102 that may be disposed opposite the front end 100. The first side member 46 may be a separate component from the seat bottom shell 44 and may be made of a different material from the seat bottom shell 44. For instance, the first side member 46 may be made of metal. In at least one configuration, the first side member 46 may include a first pad 110, second pad 112, a third pad 114, a tilt adjuster opening 116, a first lower mounting hole 118, a second lower mounting hole 120, a track mounting hole 122, a tilt adjuster linkage mounting hole 124, and one or more tilt adjuster actuator mounting holes 126.

The first pad 110 may be disposed proximate the front end 100 of the first side member 46. For example, the first pad 110 may be longitudinally positioned between the front end 100 and the third pad 114. In addition, the first pad 110 may be longitudinally positioned between the front end 100 and at least one tilt adjuster actuator mounting hole 126 or the tilt adjuster linkage mounting hole 124. The first pad 110 may also be disposed between and may be spaced apart from a top side of the first side member 46 and a bottom side of the first side member 46 that may be disposed opposite the top side. The first pad 110 may protrude laterally from the first side member 46 toward the first lateral side wall 56. As such, the first side member 46 may be spaced apart from the inboard side 80 of the first lateral side wall 56 between the first pad 110 and the third pad 114. The first pad 110 may have substantially the same contour as the portion of the inboard side 80 that the first pad 110 may be disposed on or may engage. Optionally, the first pad 110 may be provided with a plurality of through holes 130 that may extend through the first pad 110.

An adhesive 90 may adhere the first pad 110 to the inboard side 80. The adhesive 90 may be applied to the first pad 110, the inboard side 80, or both. The adhesive 90 may also be received in one or more through holes 130. As such, the through holes 130 may provide additional surface area upon which the adhesive 90 may bond and may allow excess adhesive 90 to flow into the through holes 130 when the first pad 110 is pressed against the first lateral side wall 56.

The second pad 112 may be disposed proximate the rear end 102 of the first side member 46. For example, the second pad 112 may be longitudinally positioned between the rear end 102 and the third pad 114. In addition, the second pad 112 may be longitudinally positioned between the rear end 102 and the first lower mounting hole 118, the second lower mounting hole 120, or both. As such, the second pad 112 may be disposed under the seat back 14. The second pad 112 may extend from the top side of the first side member 46 toward the bottom side of the first side member 46. The second pad 112 may protrude laterally from the first side member 46 toward the first lateral side wall 56. As such, the first side member 46 may be spaced apart from the inboard side 80 of the first lateral side wall 56 between the second pad 112 and the third pad 114. In addition, the second pad 112 may be laterally disposed between the inboard side 80 of the first lateral side wall 56 and a lower recliner mechanism bracket 26 such that the second pad 112 is spaced apart from the lower recliner mechanism bracket 26 as is best shown in FIG. 9. The second pad 112 may have substantially the same contour as the portion of the inboard side 80 that the second pad 112 may be disposed on or may engage. In addition, the second pad 112 may have a smaller area or area of contact with the inboard side 80 than the first pad 110. Optionally, the second pad 112 may be provided with a plurality of through holes 130 that may extend through the second pad 112. An adhesive 90 may adhere the second pad 112 to the inboard side 80. The adhesive 90 may be applied to the second pad 112, the inboard side 80, or both. The adhesive 90 may also be received in one or more through holes 130 as previously discussed.

The third pad 114 may be longitudinally positioned between the first pad 110 and the second pad 112. In addition, the third pad 114 may be spaced apart from the first pad 110 and the second pad 112. The second pad 112 may be disposed near the middle of the first side member 46. As such, the third pad 114 may not be disposed under the seat back 14 when the seat back 14 is in an upright position. The third pad 114 may be disposed between and may be spaced apart from the top side of the first side member 46 and the bottom side of the first side member 46. The third pad 114 may protrude laterally from the first side member 46 toward the first lateral side wall 56. The third pad 114 may have substantially the same contour as the portion of the inboard side 80 that the third pad 114 may be disposed on or may engage. In addition, the third pad 114 may have a larger area or area of contact with the inboard side 80 than the first pad 110 and the second pad 112. Optionally, the third pad 114 may be provided with a plurality of through holes 130 that may extend through the third pad 114. An adhesive 90 may adhere the third pad 114 to the inboard side 80. The adhesive 90 may be applied to the third pad 114, the inboard side 80, or both. The adhesive 90 may also be received in one or more through holes 130 as previously discussed.

The tilt adjuster opening 116 may be longitudinally positioned between the first pad 110 and the third pad 114. As such, the first pad 110 and the third pad 114 may be disposed on opposite sides of the tilt adjuster opening 116. The tilt adjuster opening 116 may be aligned with the tilt adjuster aperture 84 in the seat bottom shell 44 and may receive a portion of the tilt adjuster mechanism 88, such as the actuator 86.

The first lower mounting hole 118 and the second lower mounting hole 120 may facilitate mounting of a lower recliner mechanism bracket 26, which is best shown in FIG. 9. For instance, the first lower mounting hole 118 and the second lower mounting hole 120 may each receive a fastener, such as a bolt, that may facilitate mounting of the lower recliner mechanism bracket 26 to the first side member 46. The first lower mounting hole 118, the second lower mounting hole 120, or both may be longitudinally positioned between the second pad 112 and the third pad 114. As such, the second pad 112 and the third pad 114 may be disposed on opposite sides of the first lower mounting hole 118, the second lower mounting hole 120, or both. Another fastener 140, such as a bushing or nut, may be aligned with the first lower mounting hole 118 and the second lower mounting hole 120. The fasteners 140 may be fixedly attached to the first side member 46 in any suitable manner, such as by welding. The fasteners 140 may be mounted on an outboard side of the first side member 46 that may face toward the first lateral side wall 56 of the seat bottom shell 44 in one or more configurations.

The track mounting hole 122 may facilitate mounting of the seat track assembly 30 to the first side member 46. For instance, the track mounting hole 122 may receive a fastener, such as a bolt, that may couple the seat track assembly 30 to the first side member 46. The track mounting hole 122 may be longitudinally positioned between the second pad 112 and the third pad 114. A fastener 140 may be aligned with the track mounting hole 122 and may be fixedly attached to the first side member 46. The fastener 140 may receive a fastener, such as a bolt, that may extend through the track mounting hole 122.

The tilt adjuster linkage mounting hole 124 may facilitate mounting of a portion of the tilt adjuster mechanism 88 to the first side member 46. For instance, the tilt adjuster linkage mounting hole 124 may receive a fastener, such as a pin or bolt, that may pivotally couple a linkage of the tilt adjuster mechanism 88 to the first side member 46. The tilt adjuster linkage mounting hole 124 may be longitudinally positioned between the tilt adjuster opening 116 and the third pad 114. A fastener 140 may be aligned with the tilt adjuster linkage mounting hole 124 and may be fixedly attached to the first side member 46. The fastener 140 may receive the fastener that extends through the tilt adjuster linkage mounting hole 124.

One or more tilt adjuster actuator mounting holes 126 may be disposed adjacent to the tilt adjuster opening 116. The tilt adjuster actuator mounting holes 126 may facilitate mounting of a portion of the tilt adjuster mechanism 88, such as the actuator 86, to the first side member 46. A fastener 140 may be aligned with one or more of the tilt adjuster actuator mounting holes 126 and may be fixedly attached to the first side member 46. Each fastener 140 may receive the fastener, such as a bolt, that may extend through a corresponding tilt adjuster actuator mounting hole 126.

The second side member 48 may have a similar configuration as the first side member 46. For example, the second side member 48 may have mirror symmetry with the first side member 46, such as mirror symmetry with respect to a center plane 150 of the seat assembly 10 as is best shown in FIG. 4. Accordingly, the second side member 48 may have the same features as the first side member 46, but the second side member 48 may be adhered to the inboard side 80 of the second side member 48 rather than the first side member 46. Common reference numbers are used to reference corresponding features of the first side member 46 and the second side member 48. Fasteners 140 may not be provided with the tilt adjuster actuator mounting holes 126 of the second side member 48 when fasteners 140 are provided with the tilt adjuster actuator mounting holes 126 of the first side member 46 and vice versa. The second side member 48 may be a separate component from the seat bottom shell 44 and may be made of a different material from the seat bottom shell 44. For instance, the first side member 46 may be made of metal.

Referring to FIGS. 1 and 2, the seat back 14 may be configured to support the back of a seat occupant. For reference purposes the side of the seat back 14 or side of components of the seat back 14 that face in a forward direction or toward a seat occupant may be referred to at a front side. A back side may be disposed opposite the front side. The side closest to the seat bottom 12 when the seat back 14 is not folded over the seat bottom 12 or is in a nominal seating position as shown in FIG. 1 may be referred to as a bottom side. A top side may be disposed opposite the bottom side. The left and right sides or lateral sides that may extend between the front side and the back side and that may extend between the top and bottom sides may be referred to as lateral sides. In at least one configuration, the seat back 14 may include a seat back trim cover 160, a seat back cushion 162, a seat back shell 164, a first bracket 166, and a second bracket 168.

Referring to FIG. 1, the seat back trim cover 160 may be disposed over or upon the seat back cushion 162 and may form or provide at least a portion of a visible exterior surface of the seat back 14. The seat back trim cover 160 may include a plurality of trim panels that may be assembled in any suitable manner, such as by stitching. In addition, the seat back trim cover 160 may be made of any suitable material or materials, such as fabric, leather, vinyl, carpet, or combinations thereof.

The seat back cushion 162 may be at least partially concealed by the seat back trim cover 160 and may be supported by the seat back shell 164. The seat back cushion 162 may be made of any suitable material, such as foam. The seat back cushion 162 may include or help define a pair of side bolsters 170 and a center seating region 172, which are best shown in FIG. 1.

The side bolsters 170 may generally extend along opposing lateral sides of the seat back 14 and may extend between the top side and bottom side of the seat back cushion 162. As such, the side bolsters 170 may be disposed along opposite sides of the center seating region 172 and may extend outwardly or forwardly from the center seating region 172 toward a seat occupant.

The center seating region 172 may be configured to support the back of a seat occupant. The center seating region 172 may be disposed between the side bolsters 170 and may extend between the top and bottom of the seat back cushion 162.

Referring to FIGS. 2 and 6-8, the seat back shell 164 may provide structural support for the seat back 14. The seat back shell 164 may be made of a fiber reinforced material, such as a polymeric resin that may incorporate and may be reinforced with carbon fiber. As such, the seat back shell 164 may allow a seat back 14 to be provided that may have high-strength and low weight. In at least one configuration, the seat back shell 164 may define at least a portion of the exterior surface of the seat back 14. The seat back shell 164 may include a back panel 180, a first side wall 182, a second side wall 184, and a brace 186.

The back panel 180 may extend laterally across the back side of the seat back 14. The back panel 180 may be integrally formed with the first side wall 182 and the second side wall 184 such that the back panel 180, first side wall 182, and the second side wall 184 are a unitary one-piece component. As is best shown in FIG. 7, the back panel 180 may include a front side 190 and a back side 192.

The front side 190 may face toward a seat occupant or toward the front of the seat back 14.

The back side 192 may be disposed opposite the front side 190. As such, the back side 192 may be a back side or an exterior surface of the seat back shell 164.

Figure 6:
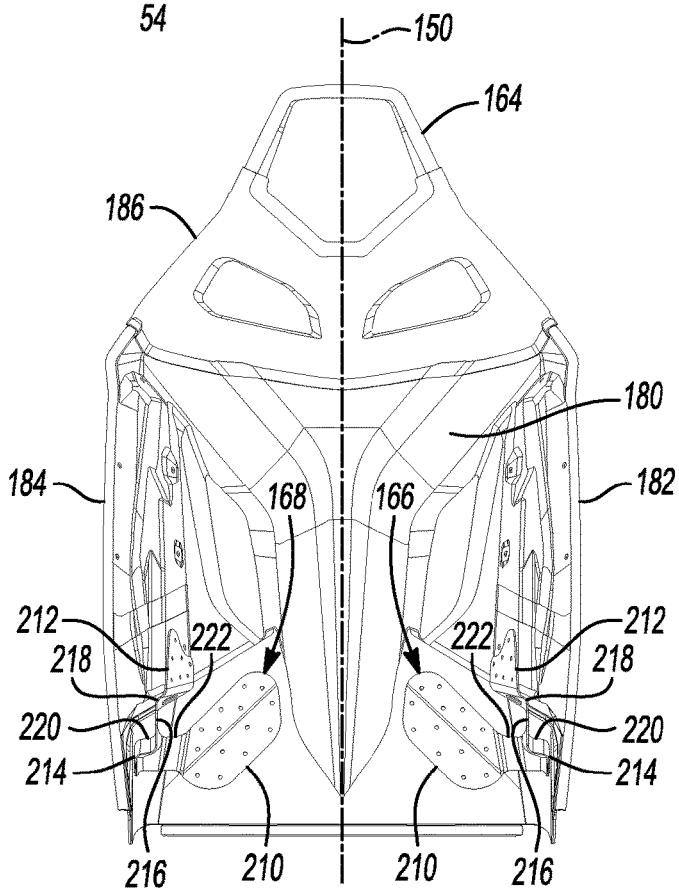
FIG. 6 is a front view of a seat back structure of the seat assembly.
Figure 7:
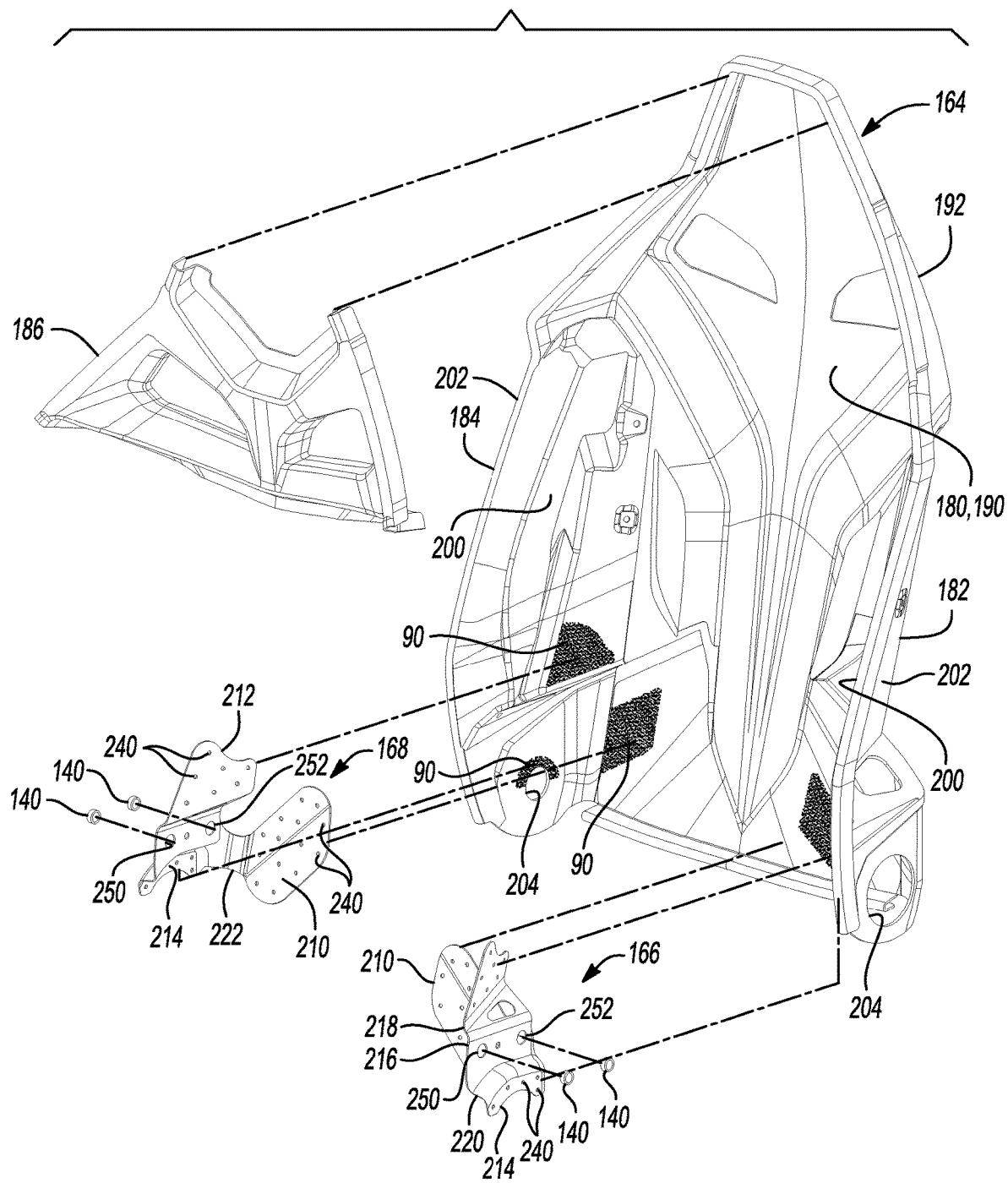
FIG. 7 is an exploded view of the seat back structure of FIG. 6.

Referring to FIGS. 6-8. the first side wall 182 may extend from a lateral end of the back panel 180. For example, the first side wall 182 may extend in a forward direction from a left end or a right end of the back panel 180. In addition, the first side wall may extend in a generally vertical direction between the top and bottom sides of the seat back 14. In at least one configuration, the first side wall 182 may include an inboard side 200, an outboard side 202, and a hole 204.

The inboard side 200 may face toward the center of the seat back 14. For instance, the inboard side 200 may face toward the second side wall 184.

The outboard side 202 may be disposed opposite the inboard side 200. As such, the outboard side 202 may be an exterior surface of the seat back shell 164.

The hole 204 may be a through hole that may extend from the inboard side 200 to the outboard side 202. As is best shown in FIG. 2, the hole 204 may receive a portion of a recliner mechanism 22 or a handle or linkage that may extend from the recliner mechanism 22.

The second side wall 184 may be disposed opposite the first side wall 182. As such, the second side wall 184 may be disposed along a second lateral side of the seat back shell 164. For instance, the second side wall 184 may extend along a left side or a right side of the seat back shell 164. For convenience in reference, the second side wall 184 is depicted as extending along the left side of the seat back shell 164 when the seat back shell 164 is viewed from the front; however, it is contemplated that the designations of the first side wall 182 and the second side wall 184 may be reversed. The second side wall 184 may have a similar configuration as the first side wall 182. For example, the second side wall 184 may have mirror symmetry with the first side wall 182, such as mere symmetry with respect to the center plane 150. As such, the second side wall 184 may have an inboard side 200 that may face toward the center plane 150 and the first side wall 182, an outboard side 202 that may be disposed opposite the inboard side 200, and a hole 204 as previously described.

The brace 186 may be fixedly mounted to the back panel 180. For example, the brace 186 may be mounted to the front side of the back panel 180 or to the first side wall 182 and the second side wall 184. The brace 186 may reinforce the seat back shell 164 near the shoulder or neck area of a seat occupant and may be disposed under the seat back cushion 162.

The seat back shell 164 and the seat bottom shell 44 may be made in a common tool or in separated or separate tools. For instance, a carbon fiber textile may be placed on or stretched over a tool or mold that may be contoured to the desired shape of the seat back shell 164 and the seat bottom shell 44. The textile may then be molded or formed in an autoclave at elevated pressure and temperature with respect to ambient pressure and temperature, and then cut into separate parts if needed. The brace 186 may be pre-formed and may be positioned in the tool or mold when the seat back shell 164 is formed so that the brace 186 is integral with the seat back shell 164. Various openings may then be cut, drilled, or milled into the seat bottom shell 44 and the seat back shell 164, such as before adhering the first and second side members 46, 48 to the seat bottom shell 44 or adhering the first and second brackets 166, 168 to the seat back shell 164.

The first bracket 166 may be adhered to the back panel 180. More specifically, the first bracket 166 may be adhered to the front side 190 of the back panel 180 and to the inboard side 200 of the first side wall 182 with an adhesive 90. In addition, the first bracket 166 may not extend past a front edge of the first side wall 182 that may be disposed opposite the back panel 180. The first bracket 166 may be a separate component from the seat back shell 164 and may be made of a different material from the seat back shell 164. For instance, the first side member 46 may be made of metal. In at least one configuration, the first bracket 166 may include a first bracket pad 210, a second bracket pad 212, a third bracket pad 214, an intermediate portion 216, a first step 218, a second step 220, and a connecting arm 222.

The first bracket pad 210 may be disposed on the front side 190 of the back panel 180. The first bracket pad 210 may be laterally positioned between the center plane 150 and the first side wall 182. For example, the first bracket pad 210 may be spaced apart from the inboard side 200 of the first side wall 182. In addition, the first bracket pad 210 may be disposed near the bottom of the back panel 180. The first bracket pad 210 may have substantially the same contour as the portion of the front side 190 that the first bracket pad 210 may be disposed on or may engage. Optionally, the first bracket pad 210 may be provided with a plurality of through holes 240 that may extend through the first bracket pad 210.

Adhesive 90 may adhere the first bracket pad 210 to the front side 190. The adhesive 90 may be applied to the first bracket pad 210, the front side 190, or both. The adhesive 90 may also be received in one or more through holes 240. As such, the through holes 240 may provide additional surface area upon which the adhesive 90 may bond and may allow the excess adhesive 90 to flow into the through holes 240 when the first bracket pad 210 is pressed against the back panel 180.

The second bracket pad 212 may be disposed on the inboard side 200 of the first side wall 182. In addition, the second bracket pad 212 may be spaced apart from the first bracket pad 210. The second bracket pad 212 may be spaced apart from the front side 190 of the back panel 180 in one or more configurations. The second bracket pad 212 may have substantially the same contour as the portion of the inboard side 200 that the second bracket pad 212 may be disposed on or may engage. In addition, the second bracket pad 212 may have a smaller area or area of contact with the inboard side 200 that the area or area of contact that the first bracket pad 210 has with the front side 190 of the back panel 180. Optionally, the second bracket pad 212 may be provided with a plurality of through holes 240 that may extend through the second bracket pad 212. Adhesive 90 may adhere the second bracket pad 212 to the inboard side 200. The adhesive 90 may be applied to the second bracket pad 212, the inboard side 200, or both. The adhesive 90 may also be received in one or more through holes 240 as previously discussed.

The third bracket pad 214 may also be disposed on the inboard side 200 of the first side wall 182. In addition, the third bracket pad 214 may be spaced apart from the first bracket pad 210 and the second bracket pad 212. The third bracket pad 214 may also be spaced apart from the front side 190 of the back panel 180 in one or more configurations. The third bracket pad 214 may be disposed below the second bracket pad 212, or closer to the bottom of the first side wall 182 than the second bracket pad 212. More specifically, the third bracket pad 214 may be disposed further from the center plane 150 than the second bracket pad 212. For instance, the third bracket pad 214 may be disposed adjacent to the hole 204 in the first side wall 182 and may extend partially around the circumference of the hole 204. The third bracket pad 214 may have a smaller area or area of contact with the inboard side 200 than the second bracket pad 212. As is best shown with reference to FIGS. 6 and 8, the third bracket pad 214 may be laterally offset from the second bracket pad 212. As such, the third bracket pad 214 may be disposed further from the center plane 150 than the second bracket pad 212. In addition, the third bracket pad 214 may be disposed closer to the seat bottom 12 than the second bracket pad 212. Optionally, the second bracket pad 212 may be provided with a plurality of through holes 240 that may extend through the second bracket pad 212. Adhesive 90 may adhere the second bracket pad 212 to the inboard side 200. The adhesive 90 may be applied to the second bracket pad 212, the inboard side 200, or both. The adhesive 90 may also be received in one or more through holes 240 as previously discussed.

The first bracket pad 210, second bracket pad 212, and the third bracket pad 214 may be disposed in different planes that may not be oriented parallel to each other. For instance, the first bracket pad 210 and second bracket pad 212 may be disposed in planes that may be offset in a range of 30 to 60° with respect to each other. For instance, the first bracket pad 210 may be offset from the second bracket pad 212 by about 45. Similarly, the second bracket pad 212 and the third bracket pad 214 may be disposed in planes that may be offset in a range of 30 to 60° with respect to each other. For instance, the second bracket pad 212 may be offset from the third bracket pad 214 by about 45°. Positioning the first bracket pad 210, the second bracket pad 212, and a third bracket pad 214 in offset planes may help prevent the first bracket 166 from sliding along the seat back shell 164, which in turn may help prevent the first bracket 166 from spreading the adhesive across the seat back shell 164 to locations where the adhesive is not desired or is not disposed between the first bracket 166 and the seat back shell 164. In addition, the offset planes and may help prevent the first bracket 166 from scratching or otherwise damaging the seat back shell 164.

The intermediate portion 216 may be positioned between the second bracket pad 212 and the third bracket pad 214. For instance, the intermediate portion 216 may be disposed below the second bracket pad 212 and above the third bracket pad 214. As such, the second bracket pad 212 and the third bracket pad 214 may be disposed on opposite sides of the intermediate portion 216. The intermediate portion 216 may be spaced apart from the first side wall 182. In at least one configuration, the intermediate portion 216 may include a first upper mounting hole 250 and a second upper mounting hole 252.

The first upper mounting hole 250 and the second upper mounting hole 252 may facilitate mounting of the upper recliner mechanism bracket 28. For instance, the first upper mounting hole 250 and the second upper mounting hole 252 may each receive a fastener, such as a bolt, that may facilitate mounting of the upper recliner mechanism bracket 28 to the first bracket 166. Another fastener 140, such as a bushing or not, may be aligned with the first upper mounting hole 250 and the second upper mounting hole 252. The fasteners 140 may be mounted on an outboard side of the intermediate portion 216 that may face toward the first side wall 182 of the seat back shell 164 in one or more configurations.

The first step 218 may extend from the second bracket pad 212 to the intermediate portion 216. The first step 218 may extend laterally in a direction that extends away from the center plane 150. For instance, the first step 218 may extend from an end of the second bracket pad 212 in a direction that extends away from the center plane 150 to an upper end of the intermediate portion 216.

The second step 220 may be disposed opposite the first step 218. In addition, the second step 220 may extend from the third bracket pad 214 to the intermediate portion 216. The second step 220 may extend laterally in a direction that extends away from the center plane 150. For instance, the second step 220 may extend from a lower end of the intermediate portion 216 in a direction that extends away from the center plane 152 a top side of the third bracket pad 214. The second step 220 may also extend from the connecting arm 222.

The connecting arm 222 may extend from the first bracket pad 210 to one or more features of the first bracket 166. For example, the connecting arm 222 may extend from the first bracket pad 210 to the second bracket pad 212, the third bracket pad 214, the intermediate portion 216, the first step 218, the second step 220, or combinations thereof. In the configuration shown, the connecting arm 222 extends from the first bracket pad 210 to the third bracket pad 214, the intermediate portion 216, and the second step 220. The connecting arm 222 may extend along and may engage or contact the front side 190 of the back panel 180.

The second bracket 168 may have a similar configuration as the first bracket 166. For example, the second bracket 168 may have mirror symmetry with the first bracket 166, such as mirror symmetry with respect to the center plane 150 as is best shown in FIG. 6. Accordingly, the second bracket 168 may have the same features as the first bracket 166, but the second bracket 168 may be adhered to the inboard side 200 of the second side wall 184 rather than the first side wall 182. Common reference numbers are used to reference corresponding features of the first bracket 166 and the second bracket 168.

Providing a seat assembly that combines large carbon fiber shells with metal brackets or side members may help reduce the overall weight of the seat assembly. In addition, adhering the brackets or side members to the carbon fiber shells may eliminate welds, mechanical fasteners, additional brackets or other interfacing parts that may form a seat back frame or a seat bottom frame, thereby helping reduce the overall dimensions or package space of the seat assembly. In addition, using an adhesive to adhere or glue components to carbon fiber shells may help reduce the total number of parts and may reduce or eliminate parts that may otherwise protrude toward a seat occupant, thereby helping improve seat occupant comfort.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a seat bottom that includes:
        a seat bottom shell that is made of carbon fiber and that has a first lateral side wall and a second lateral side wall that is spaced apart from and disposed opposite the first lateral side wall;
        a first side member that is adhered to an inboard side of the first lateral side wall that faces toward the second lateral side wall with adhesive; and
        a second side member that is adhered to an inboard side of the second lateral side wall that faces toward the first lateral side wall with adhesive, wherein the first side member and the second side member are made of metal; and
    a seat back pivotally disposed on the seat bottom, the seat back including:
        a seat back shell that is made of carbon fiber;
        a first bracket that is adhered to the seat back shell with adhesive; and
        a second bracket that is spaced apart from the first bracket and adhered to the seat back shell with adhesive, wherein the first bracket and the second bracket are made of metal.

2. The seat assembly of claim 1 wherein the first side member includes a first pad disposed proximate a front end of the first side member, a second pad disposed proximate a rear end of the first side member that is disposed opposite the front end, and a third pad that is located between the first pad and the second pad and is spaced apart from the first pad and the second pad, wherein adhesive is disposed on the first pad, the second pad, and the third pad and adheres the first side member to the seat bottom shell.

3. The seat assembly of claim 2 wherein the third pad has a larger area than the first pad and the first pad has a larger area than the second pad.

4. The seat assembly of claim 2 wherein the second pad is located under the seat back.

5. The seat assembly of claim 2 wherein the first pad, the second pad and the third pad each have a plurality of through holes that receive the adhesive.

6. The seat assembly of claim 2 wherein the first side member has a tilt adjuster opening through which a tilt adjuster mechanism extends, wherein the first pad and the third pad are disposed on opposite sides of the tilt adjuster opening.

7. The seat assembly of claim 6 wherein the first side member has a first lower mounting hole and a second lower mounting hole that facilitate mounting of a lower recliner mechanism bracket that extends from a recliner mechanism, wherein the second pad and the third pad are disposed on opposite sides of the first lower mounting hole.

8. The seat assembly of claim 7 wherein the second pad is laterally disposed between the inboard side of the first lateral side wall and the lower recliner mechanism bracket such that the second pad is spaced apart from the lower recliner mechanism bracket.

9. The seat assembly of claim 2 wherein a seat track assembly is mounted to the first side member between the second pad and the third pad.

10. A seat assembly comprising:
a seat bottom that includes:
a seat bottom shell that is made of carbon fiber;
a first side member that is adhered to the seat bottom shell with adhesive; and
a second side member that is disposed opposite the first side member and adhered to the seat bottom shell with adhesive, wherein the first side member and the second side member are made of metal; and
a seat back pivotally disposed on the seat bottom, the seat back including:
a seat back shell that is made of carbon fiber and that has a back panel, a first side wall that extends forward from the back panel, and a second side wall that extends forward from the back panel and is spaced apart from and disposed opposite the first side wall;
a first bracket that is adhered to the back panel and the first side wall with adhesive; and
a second bracket that is spaced apart from the first bracket and adhered to the back panel and the second side wall with adhesive, wherein the first bracket and the second bracket are made of metal.

11. The seat assembly of claim 10 wherein the first bracket has a first bracket pad that is spaced apart from the first side wall and a second bracket pad that is spaced apart from the first bracket pad, wherein the first bracket pad and the second bracket pad are adhered to the seat back shell.

12. The seat assembly of claim 11 wherein the first bracket has a third bracket pad that is spaced apart from the first bracket pad and the second bracket pad, wherein the adhesive adheres the second bracket pad and the third bracket pad to the first side wall and the third bracket pad is disposed closer to the seat bottom than the second bracket pad.

13. The seat assembly of claim 12 wherein the second bracket pad and the third bracket pad are spaced apart from the back panel.

14. The seat assembly of claim 12 wherein the first bracket pad has a larger area than the second bracket pad and the second bracket pad has a larger area than the third bracket pad.

15. The seat assembly of claim 12 wherein the first bracket pad, the second bracket pad, and the third bracket pad each have a plurality of through holes that receive the adhesive.

16. The seat assembly of claim 12 wherein the first bracket has an intermediate portion that has a first upper mounting hole and a second upper mounting hole that facilitate mounting of an upper recliner mechanism bracket that extends from a recliner mechanism, wherein the second bracket pad and the third bracket pad are disposed on opposite sides of the intermediate portion.

17. The seat assembly of claim 16 wherein the first side wall of the seat back shell has a hole that receives the recliner mechanism and the third bracket pad is disposed adjacent to the hole and extends partially around the hole.

18. The seat assembly of claim 16 wherein the second bracket pad is disposed closer to a center plane of the seat back than the third bracket pad.

19. The seat assembly of claim 16 wherein the first bracket has a first step that extends from the second bracket pad to the intermediate portion and a second step that extends from the third bracket pad to the intermediate portion, wherein the intermediate portion is laterally offset from the second bracket pad and the third bracket pad.

20. The seat assembly of claim 19 wherein a connecting arm extends from the first bracket pad to the intermediate portion and the third bracket pad.

* * * * *